United States Patent [19]

Hornby

[11] Patent Number: 4,797,859
[45] Date of Patent: Jan. 10, 1989

[54] METHOD FOR DETERMINING FORMATION PERMEABILITY BY COMPARING MEASURED TUBE WAVES WITH FORMATION AND BOREHOLE PARAMETERS

[75] Inventor: Brian E. Hornby, Ridgefield, Conn.

[73] Assignee: Schlumberger Technology Corporation, New York, N.Y.

[21] Appl. No.: 58,973

[22] Filed: Jun. 8, 1987

[51] Int. Cl.⁴ .............................................. G01V 1/40
[52] U.S. Cl. ........................................ 367/31; 367/32; 367/75
[58] Field of Search ....................... 367/25, 31, 75, 32, 367/49; 181/104, 105; 364/422

[56] References Cited

U.S. PATENT DOCUMENTS

| | | | |
|---|---|---|---|
| 4,575,828 | 3/1986 | Williams | 367/75 |
| 4,594,691 | 6/1986 | Kimball et al. | 367/32 |
| 4,633,449 | 12/1986 | Ingram et al. | 367/25 |

OTHER PUBLICATIONS

J. E. White, "Underground Sound", *Elsevier*, (Amsterdam, 1983).

Williams et al., "The Long Spaced Acoustic Logging Tool", *SPWLA 25th Annual Logging Symposium*, Jun. 10–13, 1984.

Zemanek et al., "New Developments in Acoustic Logging", *Proceedings of the Indonesian Pet. Assoc. 14th Annual Conv.*, Oct. 1985, pp. 565–586.

Rosenbaum, "Synthetic Microseismograms: Logging in Porous Formations", *Geophysics*, vol. 39, No. 1, (Feb. 1974).

Staal & Robinson, "Permeability Profiles from Acoustic Logging", *SPE Paper 6821*, 52nd Annual Fall Tech. Conf., Oct. 9–12, 1977.

Kimball & Marzetta, "Semblance Processing of Borehole Acoustic Array Date," *Geophysics*, 49, 1984, pp. 274–281.

Biot, "Propagation of Elastic Waves in a Cylindrical Bore Containing a Fluid", *Journal of Applied Physics*, vol. 23, No. 9, 1952.

White & Zechman, "Response of an Acoustic Logging Tool", *Geophysics*, 33 (1968), p. 302.

Tsang & Rader, "Numerical Evaluation of the Transient Acoustic Waveform Due to a Point Source in a Fluid-Filled Borehole", *Geophysics*, 44, (1979), pp. 1706–1720.

*Primary Examiner*—Thomas H. Tarcza
*Assistant Examiner*—Ian J. Lobo
*Attorney, Agent, or Firm*—Peter Y. Lee; Keith Smith

[57] ABSTRACT

A method for determining the fluid mobility or permeability of subsurface formations using borehole measurements of the tube wave. The slowness of an hypothetical tube wave travelling in an elastic, nonpermeable medium is computed based on various measured parameters such as the formation matrix density, fluid density and fluid acoustic slowness. This elastic model slowness is subtracted from the measured tube wave slowness of a selected formation traversed by the borehole, and the difference is used to determine the formation permeability.

5 Claims, 5 Drawing Sheets

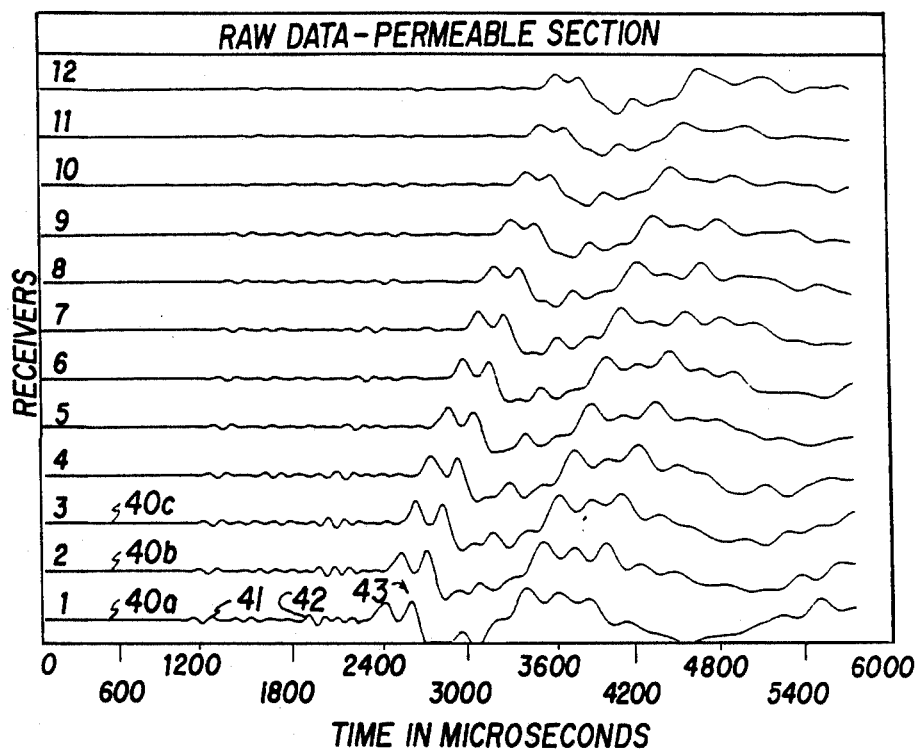
FIG. 3: RECORDED DATA-PERMEABLE SECTION
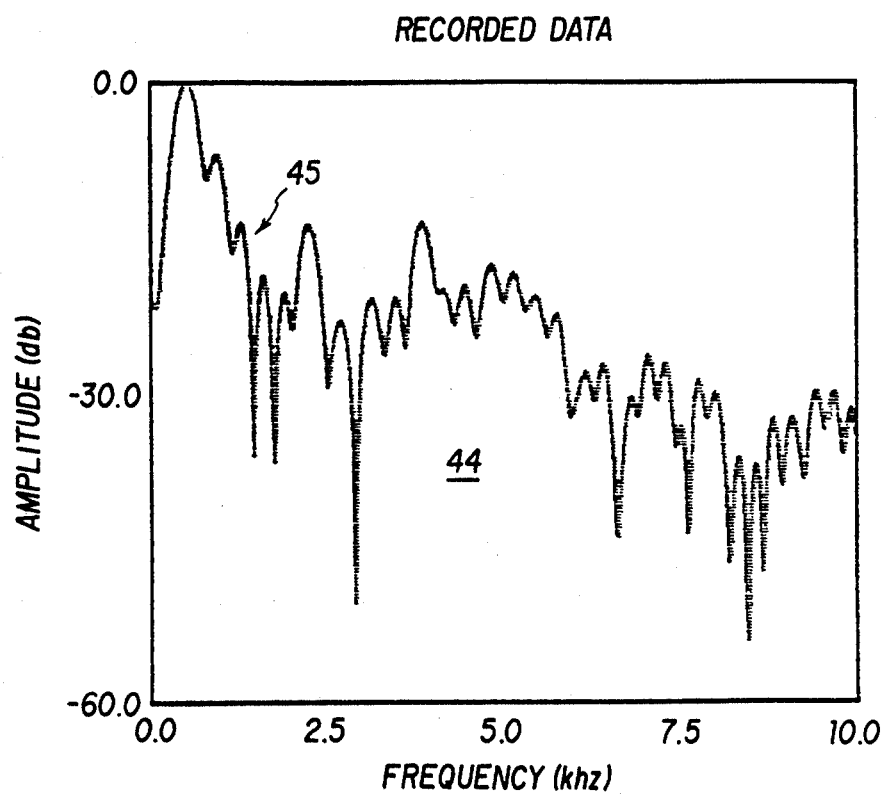
FIG. 4: AMPLITUDE SPECTRUM

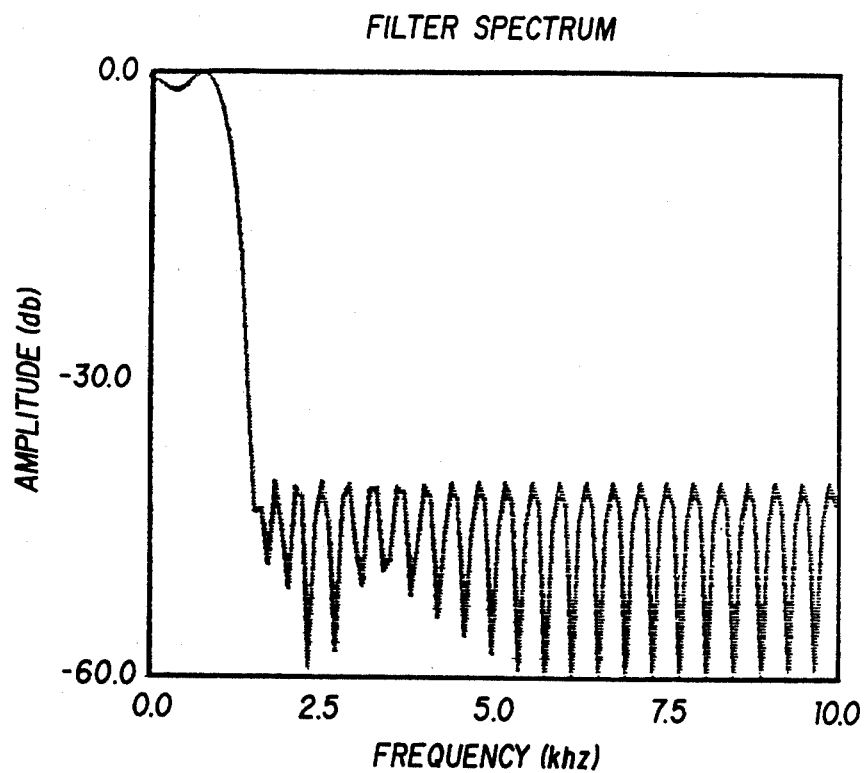
FIG. 5 : NARROW BAND FILTER SPECTRUM
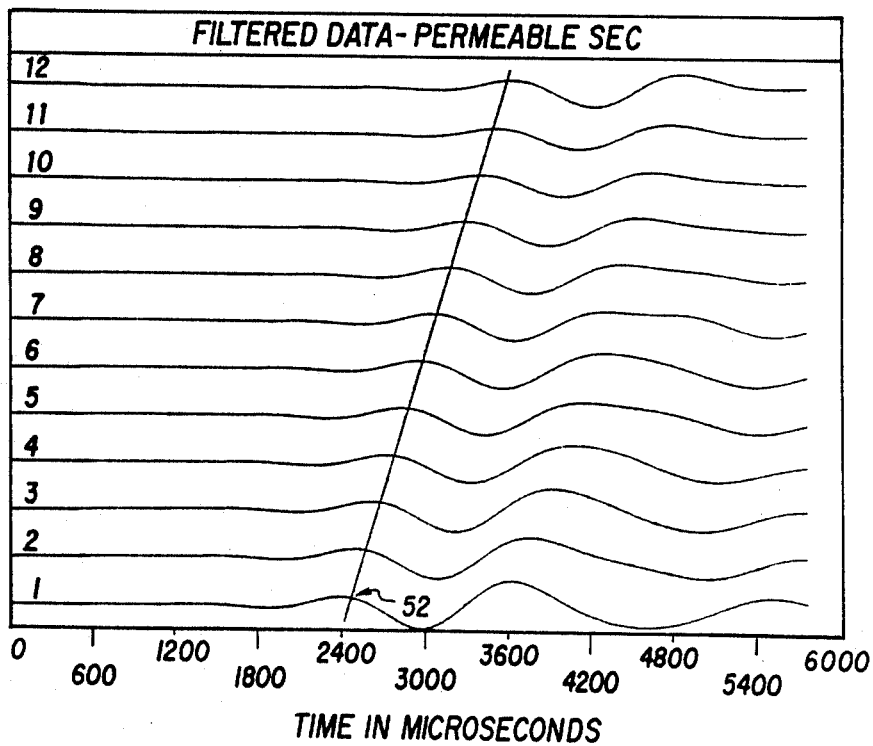
FIG. 6 : FILTERED DATA

METHOD FOR DETERMINING FORMATION PERMEABILITY BY COMPARING MEASURED TUBE WAVES WITH FORMATION AND BOREHOLE PARAMETERS

FIELD OF THE INVENTION

This invention relates to methods and apparatus for determining acoustic and fluid flow characteristics of subsurface earth formations traversed by a borehole, especially the permeability thereof.

BACKGROUND

One of the most important parameters in oil exploration and production, which has defied measurement by conventional logging tools, is the fluid permeability of rock formations penetrated by the borehole. Although permeability can be estimated by measuring the formation porosity in combination with other geologic information, which can be related to permeability, and by measuring formation permeability from core samples or from intermittent-sampling formation testing tools, no dependable method has been found to directly log formation permeability with a continuous logging tool.

It has been proposed that the acoustic tube wave traveling in a borehole is responsive to the permeability of the surrounding formations. The tube wave, also commonly referred to as Stoneley wave, is a guided surface wave which travels in a direction axially of the borehole on the surface of the borehole wall. In an important work on acoustics and geophysics, *Underground Sound*, Elsevier (Amsterdam, 1983), J. E. White has explained that a low frequency tube wave in a permeable borehole can be viewed as a pulsating pressure which displaces fluid alternately into and out of the borehole wall. He also set forth, in chapter 5, some of the basic mathematical expressions which relate formation permeability to the acoustic tube wave velocity.

However, attempts to use tube waves to measure permeability in real boreholes have had only limited success. Personnel at Mobil Research and Development Corp. have opted not to use existing acoustic logging tools, but to use a specially designed long spacing acoustic logging tool to measure tube waves, as described in D. M. Williams et al., "The Long Spaced Acoustic Logging Tool" *SPWLA 25th Annual Logging Symposium*, June 10-13, 1984. They have collected well data confirming that there is a relationship between tube wave velocity and permeability. In the article of J. Zemanek et al., "New Developments in Acoustic Logging," *Proceedings of the Indonesian Petroleum Association Fourteenth Annual Convention*, October 1985, pp. 565-586, the measured tube wave amplitude and velocity in tested wells were found to be qualitatively related to measured formation permeability, but the measurements could not be made quantitatively correct. Likewise, it has been suggested in the literature that the tube wave amplitude should be a good measure of permeability. J. H. Rosenbaum, "Synthetic Microseismograms: Logging in Porous Formations," *Geophysics, Vol.* 39, *No.* 1 February 1974).

Others at Shell have reported correlations between the acoustic energy of that part of the measured wavetrain corresponding in velocity to the tube wave, as measured by a commercially available Schlumberger acoustic tool, with measured formation permeability. J. J. Staal and J. D. Robinson, "Permeability Profiles From Acoustic Logging," SPE Paper 6821, 52nd Annual Fall Technical Conference, Oct. 9-12, 1977.

U.S. Pat. No. 4,575,828 to Williams describes a method which purports to determine both the permeability due to the rock matrix and the permeability due to fractures in the rock, using the ratio of tube wave amplitudes and travel times, respectively, measured at two spaced apart receivers in the borehole. Although this method obtains results which may correlate with field data in some respects, it does not seem to account for effects of the rock matrix or fluid on the acoustic measurement.

Despite the strong interest in linking acoustic waves and permeability, as shown by the above, the reported experimental results and field measurements have not heretofor yielded a clear theoretic or quantitative connection which can reliably predict permeability in real oil wells.

Accordingly, it is an object of the present invention to provide an improved method for determining formation permeability using acoustic data obtained from a continuous logging tool. It is also a specific object of the invention to incorporate information of the formation matrix and fluid with measured tube wave data to determine permeability. Among other objects of the invention which will become apparent from the following description, it is an object to provide practical methods to modify logged waveform data to improve the sensitivity to permeability while reducing the influences of other borehole phenomena.

SUMMARY OF THE DISCLOSURE

In the present invention, Applicant has recognized that the Stoneley wave slowness or amplitude do not adequately represent a measure of permeability unless certain elastic properties of the formation matrix and fluid are taken into account. In accordance with the present invention, continuous acoustic waveforms traversing a earth formation are measured at a plurality of locations in the borehole. In a preferred embodiment, it is desirable to determine a low frequency range having the predominant tube wave energy, for example by computing the Fourier transform of the waveform data and selecting a peak energy range in the frequency space. Then, the slowness $S_m$ of the measured tube wave is computed and compared to a theoretic Stoneley wave slowness $S_e$ which is computed under the conditions of the elastic medium theory from the formation density, borehole fluid density, borehole fluid slowness, and the shear wave slowness. The formation permeability is then determined using the difference $(S_m - S_e)$.

The slowness of the peak energy tube wave is preferably estimated by extracting the selected frequency component with a narrow band filter and using, for example, the Slowness/Time Coherence method. Alternatively, the slowness can be estimated from the phase differences of the waveforms measured at successive receivers, or using other comparable methods.

For other objects and advantages of the invention, and to provide a fuller understanding thereof, reference is made to the following description taken in conjunction with the cited references and the accompanying drawings.

BRIEF DESCRIPTION OF THE DRAWINGS

FIG. 3 illustrates the waveforms of acoustic signals received at a set of acoustic receivers spaced from each other along the length of an acoustic tool, as in FIG. 1.

FIG. 4 is a plot of the amplitube as a function of frequency, which is determined by means of a Fourier transform of one of the acoustic waveforms of FIG. 3.

FIG. 5 is a plot of amplitude as a function of frequency showing the filter spectrum of an exemplary filter which can be used in accordance with the invention.

FIG. 6 is a plot of the waveforms of FIG. 2, after it has been filtered in accordance with the filter spectrum of FIG. 5.

DETAILED DESCRIPTION

Figure 1:
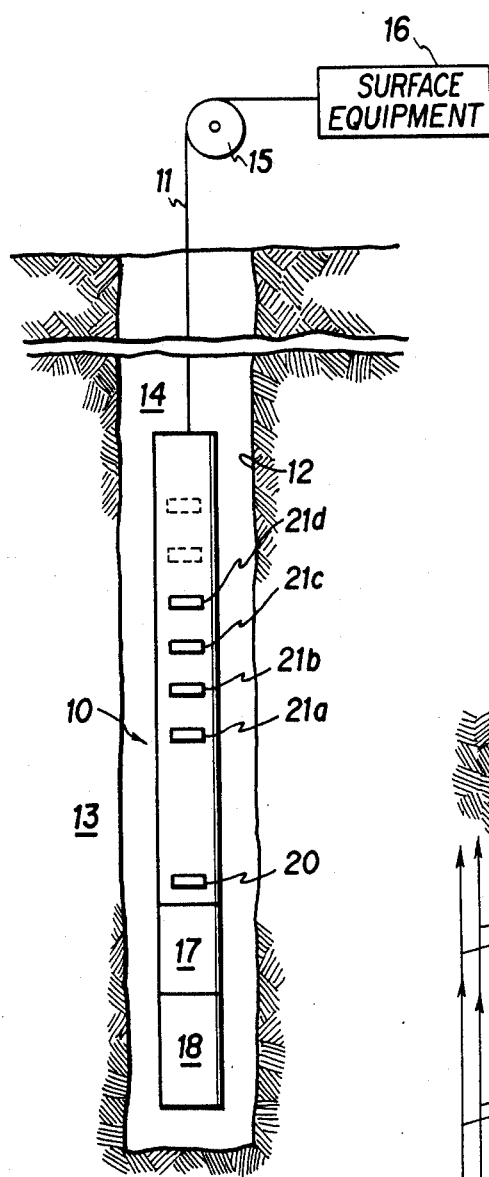
FIG. 1 illustrates a measurement tool positioned in a borehole, in accordance with an exemplary embodiment of the present invention.

Referring to FIG. 1, a borehole measurement tool or sonde 10 is connected via an armored communication cable 11 in a borehole 12 which penetrates earth formations including formation 13. The borehole 12 is filled with a fluid 14 such as drilling mud used to stabilize the borehole wall and prevent uncontrolled escape of formation fluids up the borehole. The tool 10 is moved in the borehole 12 by putting cable 11 out and reeling it back in over a sheave wheel 15 by means of a winch forming part of the surface equipment 16. The surface equipment 16 includes a depth gauge and other standard equipment used in the wireline logging and measurements while drilling (MWD) industry, and are well known in this field. In the typical borehole measurements service, measurements are taken while the tool 10 is being raised upwardly in borehole 12, although in certain circumstances they may also be taken while the tool 10 is stationary, or while it is moving downward, or in some other manner. The measurements are correlated with the measured depth of tool 10, using surface equipment 16 as well as other devices known in the art.

The tool 10 includes an acoustics source 20 and an array of acoustic detectors 21 spaced along the tool and separated from the source 20. The number of detectors is typically between 4 and 12, and only 4 detectors or receivers 21a, 21b, 21c, 21d, are explicitly shown in FIG. 1. This type of acoustic array logging tool is commercially available in the logging industry in various forms, and is known as a sonic array or full waveform logging tool. The basic structure and function of this tool is well known in the industry and is described, for example, in U.S. Pat. No. 4,594,691.

The tool 10 may include other component tools, such as an electrical formation resistivity tool 17 and a nuclear tool 18 to obtain various formation measurements as desired. The measurements taken by these and other standard logging tools are also well known in the industry, and therefore will not be described in detail here. It suffices to state that measurements of the formation deep resistivity, shallow resistivity, formation density, porosity and other parameters can be made by the known techniques, either by combining the various respective tools into one tool string 10, or by making separate logging trips with each tool or appropriate combinations of tools, etc.

During operation of the tool 10, as it is drawn up the borehole 12, the acoustic source 20 is operated repetitively to cause propagation of acoustic energy through the borehole 12 and the surrounding formation 13, to the detectors 21. Electrical waveform signals, generated by the detectors 21 and representative of the respective detected acoustic energies, are sampled and digitized. These digitized signals are suitably conditioned by an interface circuitry in tool 10 and transmitted up the cable 11 to the surface equipment 16. This equipment typically receives, decodes, amplifies and records the signals on optical film and/or magnetic tape recorders as a function of the above mentioned depth signals corresponding to the points of measurement. In addition, the surface equipment 16 may, as further described below, analyze the data represented by these signals to yield indications of the fluid flow permeability of the formation 13, and record this additional data. Further processing of these and other signals from the tool 19 enables the surface equipment 16 to monitor the operation of tool 10 and generate signals which are transmitted down the cable 11 to control tool 10, for example to synchronize the operation of its component circuits or to modify circuit parameters such as amplifier gain.

Figure 2:
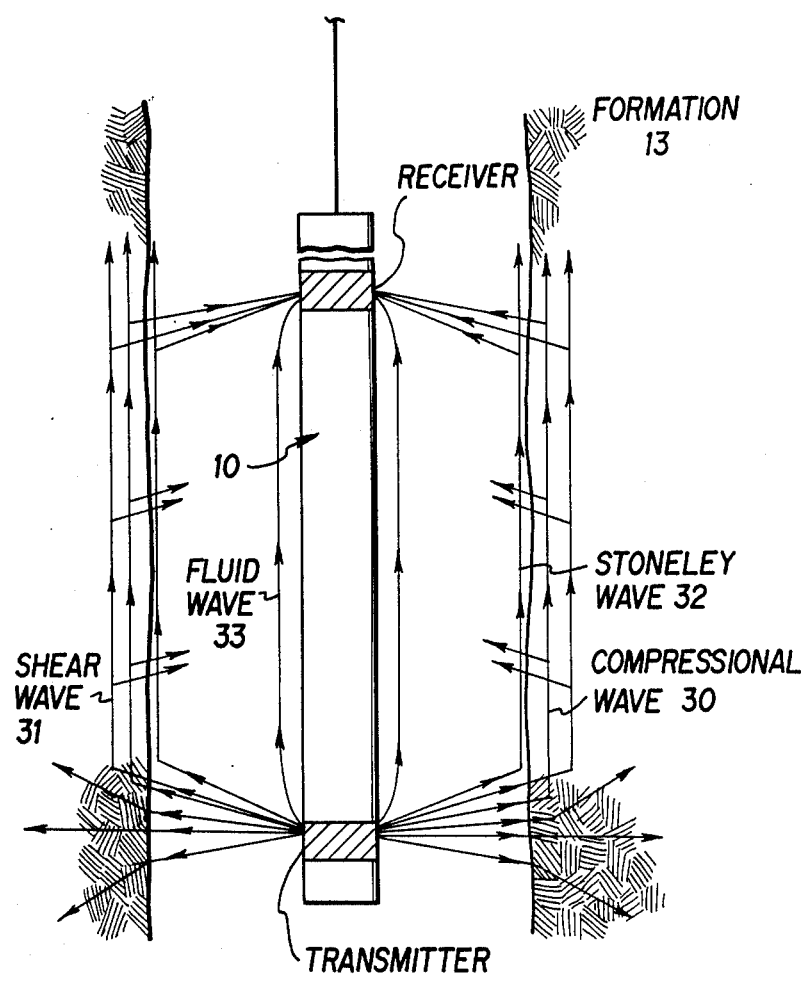
FIG. 2 schematically illustrates the borehole tool of FIG. 1 showing the various types of acoustic waves which travel from a transmitter to a receiver of the tool.

The interval between successive operations of the source 20 is chosen to allow recording of waveforms of sufficient duration to include all components of interest before arrival of energy resulting from the next successive operation of the source 20. As shown schematically in FIG. 2, these acoustic components include the formation compressional wave, also called the P-wave 30, the formation shear wave or S-wave 31, the borehole tube wave or Stoneley wave 32, the borehole fluid wave 33, and various acoustic waves within the body of the tool 10 (not shown). It is the tube wave which is of interest here.

As discussed by J. E. White in *Underground Sound*, it is believed that the tube wave, being a surface wave at the interface between the borehole fluid and the rock formation, has a tendency to induce the pore fluid in the formation to flow in an undulating fashion in sympathy with the change in pressure of the borehole fluid, and that the magnitude of this phenomenon is controlled by the fluid permeability of the rock formations traversed by the tube wave. In accordance with a preferred embodiment of the present invention, the acoustic wave form including the tube wave 32 is recorded by tool 10 at successive detectors 21a, 21b, 21c, etc., and the slowness parameter of a low frequency component is determined. Then, a Stoneley slowness parameter is theoretically computed for an elastic nonpermeable medium, and subtracted from the measured slowness parameter. The resulting difference, Delta Stoneley, is used to determine the permeability of the formation trasversed by the measured waveforms.

Referring specifically to FIG. 3, an example of the raw data collected by tool 10 is shown, including 12 separate waveforms corresponding to an array of 12 detectors 21a, 21b, . . . 21l. Each waveform 40a, 40b, 40c, . . . is recorded as a signal magnitude as a function of time in microseconds. Each of the waveforms 40 includes a portion wherein the P-wave 41, the S-wave 42, or the tube wave 43 is predominant. It is seen that the tube wave 43 moves out (to the right in FIG. 3) in time from one detector to the next successive detector away from the source 20. Thus it is possible to calculate the tube wave velocity or alternatively the tube wave slowness (microseconds per inch), these two parameters being the inverse of each other, by simply determining the amount of time it takes for a particular wave artifact to travel the known distance between the source 20 and the respective detectors 21. However, it is possible to determine the tube wave slowness parameter (slowness, velocity or its equivalent) even more accurately, by isolating a frequency bandwidth that is most representative of the predominant tube wave energy and of the formation permeability effects. This may be accomplished by converting the waveforms 40 via a Fourier Transform to the frequency domain, as shown in FIG. 4. The frequency domain signal 44 corresponds to one of the waveforms 40, although naturally any and all of the waveforms 40 can be so converted to the frequency domain. It is seen that the frequency domain signal 44 exhibits a peak region at the portion 45, approximately 500–1500 hertz, wherein much of the acoustic energy of the tube wave is contained. This knowledge of the particular frequency range which controls permeability effects of the formation 13 is helpful in determining the frequency spectrum of a filter which is to be used as discussed below.

Figure 7:
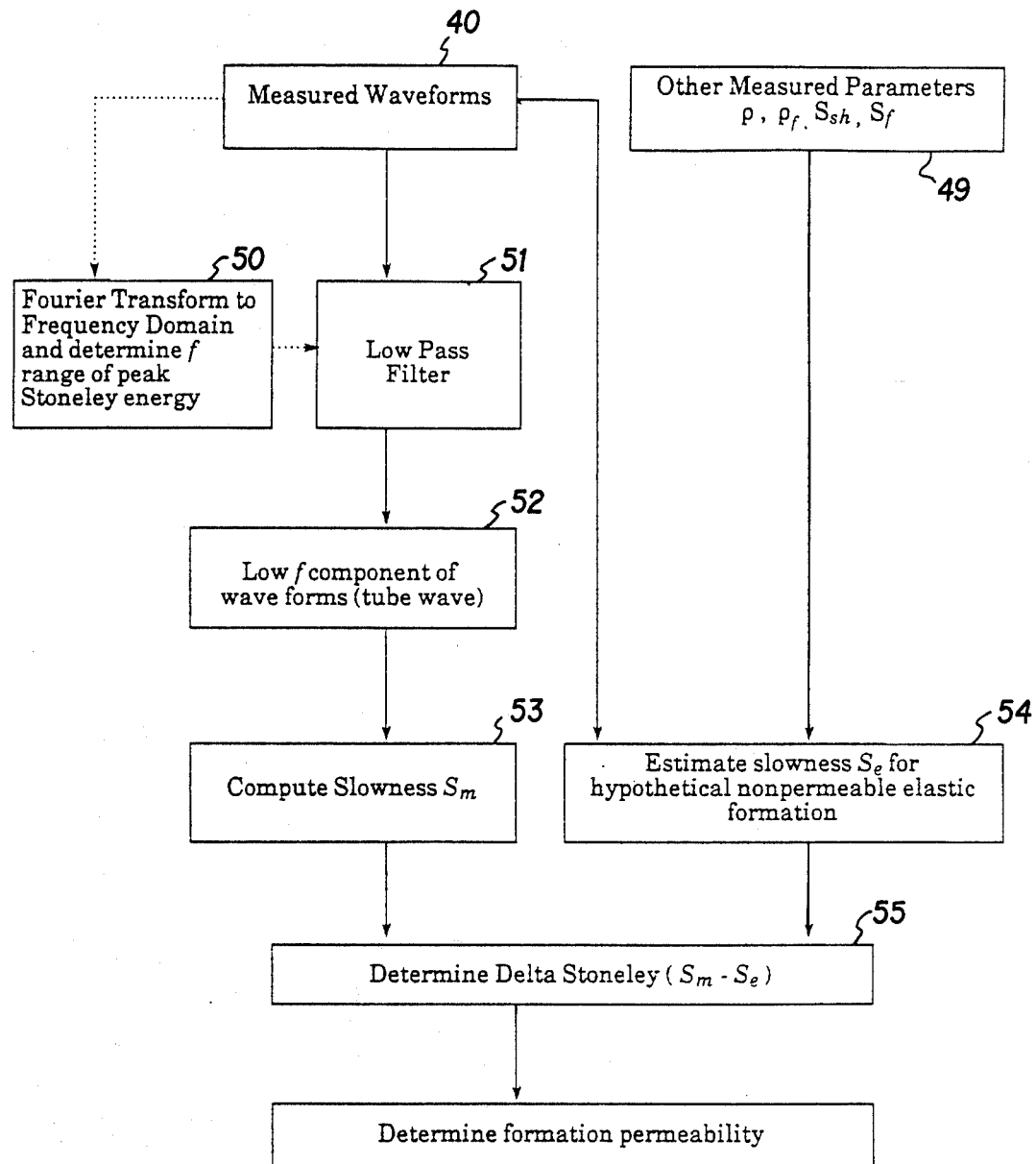
FIG. 7 is a combination block diagram showing the steps and some hardware components of the apparatus of the present invention.

Referring to FIG. 7, the measured waveforms 40 are input to a Fourier Transform computer 50, which may be one of the standard commercial software packages for converting such waveforms to the frequency domain. For example, the FFT-2C program available from IMSL, Inc., Houston Tex., may be used. Next, the tube wave portion 43 of each waveform 40 is passed through a low pass narrow band filter 51 which filters out all frequency components of the tube wave 43 other than that frequency range selected in step 50. In the given example, filter 51 excludes acoustic waves having a frequency outside the range 500–1500 Hz, but other filter ranges can also be used, subject to certain constraints. Since a frequency corresponding to a wavelength much greater than the borehole diameter is needed to enable propagation of a tube wave, the frequency of interest must be considerably lower than $$f = (D \cdot S_m)^{-1}$$

where D is the diameter of the measured borehole. For an eight inch borehole traversing a formation with slowness $S_m = 220$ μsec/ft., for example, it is expected that the tube wave frequency must be considerably less than 7500 Hz and probably less than 3 or 4 KHz. Acoustic components having a frequency higher than that would likely constitute acoustic energy not significantly affected by fluid motion in formation pores, and would not be useful for the purpose of determining permeability. However, the precise cut off point for the low pass filter is not critical, and may be determined as a compromise of various factors since it may be dependent on characteristics of the particular rock formation encountered, the borehole surface condition, and the amount and characteristics of mud cake which may cover the borehole surface.

In the next step 52, the low frequency tube wave component of each of the waveforms 40 is obtained, in the time domain. These are compared to each other at step 52 to determine the slowness $S_m$ 53 of the waveforms 40. In computing the slowness $S_m$, it is generally preferable to use the slowness/time coherence ("STC") method described in U.S. Pat. No. 4,594,691, which is incorporated herein by reference, and also explained in greater detail in C. V. Kimball and T. Marzetta, "Semblance Processing of Borehole Acoustic Array Data," *Geophysics*, 49 (1984) pages 274–281.

In accordance with the present invention, a second estimated slowness $S_e$ of the formation 13 is computed using the elastic wave theory for the travel of a hypothetical Stoneley wave pulse in the borehole 12 under the assumption that the formation is an elastic nonpermeable solid. Under these assumptions, the elastic model slowness is, at low frequencies $$S_e = \left\{ S_f^2 + \frac{\rho_f}{\rho} S_{sh}^2 \right\}^{\frac{1}{2}} \quad (1)$$

where
p is the bulk density of the formation,
$p_f$ is the density of the borehold fluid,
$S_f$ is slowness of the borehole fluid
$S_{sh}$ is slowness of the shear wave in formation 13 the above parameters can be measured, and can be used as inputs, as shown at step 49 in FIG. 7. The formation density p can be obtained from Litho-Density* logs or other similar density measurements of formation 13 (*mark of Schlumberger). The fluid density $p_f$ can be obtained from direct measurements of borehole fluid samples, which are generally the same as formation fluid in the invaded zone of a permeable formation 13. This can be accomplished by measuring borehole fluid samples at the surface, or by combining information from various types of known logging techniques. The borehole fluid slowness $S_f$ can be obtained from the fluid wave 33 portion (see FIG. 2) of the measured waveforms 40, or from measurement of borehole fluid samples at surface. Preferably $S_f$ is measured in situ with acoustic transducers built into the tool 10, for example using the apparatus and method shown in U.S. Pat. No. 4,633,449, which patent is incorporated herein by reference.

The shear wave slowness $S_{sh}$ is obtained from the measured waveforms 40 using the same approach as was used to compute the slowness of the tube wave, for example by using the STC method. Equation (1) is an approximation which gives quite adequate results considering the range of accuracies which are practically useful in determining formation permeability. Even greater accuracy can be obtained by solving the full set of transcendental equations on which equation (1) is based. By way of reference, this alternative, more complicated approach, and related computing methods, are described in the following publications: M. A. Biot, "Propagation of Elastic Waves in a Cylindrical Bore Containing a Fluid," *Journal of Applied Physics* Vol. 23, No. 9, 1952; J. E. White and R. E. Zechman, "Response of an Acoustic Logging Tool." *Geophysics*, 33 (1968), p. 302; L. Tsang and D. Rader, "Numerical Evaluation of the Transient Acoustic Waveform Due to a Point Source in a Fluid-Filled Bore-hole," *Geophysics*, 44 (1979), pp. 1706–1720

In the next step 54 55 of the present invention, the estimated value of slowness $S_e$ is subtracted from the acoustically measured value $S_m$ 55 to obtain the quantity $(S_m - S_e)$ which is representative of the mobility or, for a particular fluid, the formation permeability k shown at step 56 of the formation 13. The exact correlation between $(S_m - S_e)$ and permeability can be optimally fitted with known data fitting techniques for a particular well or type of earth formation.

Figure 8:
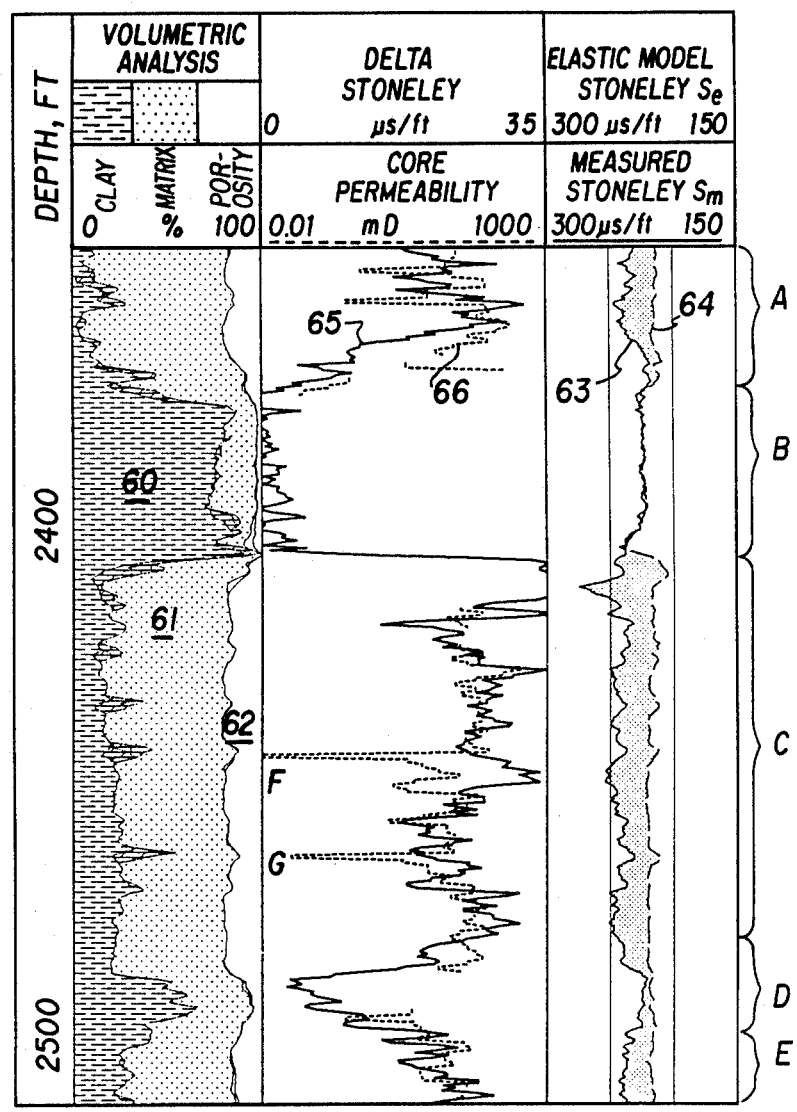
FIG. 8 is a chart showing several measured and derived logs including a log of Stoneley permeability in accordance with the invention.

Referring to FIG. 8, an exemplary log of $S_m$ and core permeability was made using measured digital acoustic waveforms. The log shows, from the left to the right side: a depth track; a Volumetric Analysis log; Delta Stoneley and Core Permeability logs; and logs of Elastic Model Stoneley slowness $S_e$ and the Measured Stoneley slowness $S_m$. On the far right are labelled five distinct zones A, B, C, D, and E, which are indicated by the log data. These zonal labels are merely for convenience of discussion, and are not meant to deny the fact that rock lithology is actually much more complicated and the indicated zones do contain other various stratifications and lithologic characteristics.

The Volumetric Analysis in FIG. 8 shows the relative proportions of clay 60, formation matrix 61, and porosity 62 in the formation surrounding borehole 12 at a particular depth. This analysis, which is well known and commercially available in the industry, is helpful in providing an indication of the formation lithology. For example, it is observed that zone B contains a very high percentage of clay, and is some form of shale, whereas zones A and C contain less than about 30% clay, with higher percentages of porosity, and therefore is expected to contain mobile fluids such as hydrocarbons, water, or some mixture of both.

The Measured Stoneley slowness $S_m$ is shown at 63, on the same track as the Elastic Model Stoneley $S_e$ shown at 64, which was computed at each depth by the equation (1) discussed previously. It is seen that $S_m$ and $S_e$ deviate in zones A, C, D, and E, but they are about equal in zone B where the permeability of the shale is expected to be zero.

The quantity $(S_m - S_e)$, called Delta Stoneley in FIG. 8, is plotted as a solid curve at 65, together with the measured core permeability shown as a dotted curve 66. The core permeability was measured with actual core plug samples obtained from the borehole during drilling. A core measurement was taken approximately at every half foot interval of core sample that was available within the given depth interval, but there were gaps at certain depths, such as in zones B and D, where the core either was not taken or was of such poor quality (from fracturing, crumbling of the core sample, etc.) that permeability could not be measured in the laboratory. However, this is not unusual and, in any event, we know from the Volumetric Analysis that zones B and D are shaley and therefore should have very low permeability.

The log shows a very good correlation between Delta Stoneley 65 and the logarithm recording of the core permeability 66 at the respective depth locations. The correlation of Delta Stoneley to core permeability is very good in zone C, both indicating permeability on the order of 100 millidarcies, although there are two spikes of extremely low core permeability at zones F and G within zone C, and corresponding to points having spikes in the clay curve 60. At these two points, there may be thin shale streaks which are clearly detected in the core measurements, but which would not be detected by the acoustic $S_m$ measurement because of its rough resolution. The high permeability shown by the Delta Stoneley curve at zone Z may very well be caused by permeable fractures which the core measurements have failed to pick up.

In zone A, the correlation between Delta Stoneley 65 and core permeability 66 is fairly good but not exact, possibly because of a slight shifting of the core depth due to core sample fracturing or crumbling, etc. It is also expected that there should be some deviation between acoustic measurements, having resolutions of several feet, and the core measurements which have depth resolutions on the order of inches. What is important to note, and extremely useful to the industry, is the enhanced ability of this technique to estimate permeability sufficiently well to distinguish produceable zones such as zone C from other zones of low permeability that are not commercially producible.

In zones B and D, Delta Stoneley indicates an extremely low permeability, which is entirely consistent with the Volumetric Analysis showing a shale zone. In zone E, which appears to be somewhat shaly, Delta Stoneley also shows a good correlation with the measured core permeability.

The preferred embodiment described hereinabove can be modified in various ways to improve the quantitative accuracy of determining permeability in different types of formations in different hydrocarbon reservoirs or exploration fields. For example, the good correlations seen in FIG. 8 can be improved and quantified by various methods such as raising the quantity $(S_m - S_e)$ to the n-th power while performing a least squares best fit routine matched to actual core data, thus optimizing the value of n and any other scaling factors. Other variations on the preferred method are also clearly possible.

It has been described and illustrated herein a novel method for determining the permeability of formations traversed by a borehole. Those skilled in the art will recognize that numerous variations and modifications may be made without departing from the scope of the present invention. Accordingly, it should be clearly understood that the forms of the invention described hereinabove are exemplary, and are not intended as limitations on the scope of the invention, which should be defined only be the claims appended hereto.

I claim:

1. A method of determining the permeability of an earth formation traversed by a borehole, using a tool adapted for movement in said borehole, comprising:

transmitting acoustic energy from a first location on said tool;

measuring the acoustic wave forms of the transmitted energy at a plurality of locations on said tool at varying distances from said first location;

filtering each of said wave forms to obtain a tube wave component;

determining a measured slowness parameter of said tube wave component;

generating a value of the computed slowness parameter for said borehole under the conditions of an elastic nonpermeable medium;

determining the difference between the measured slowness parameter and the computed value;

determining the permeability of said formation in response to the difference between said measured slowness parameter and said computed value.

2. A method as in claim 1 wherein said value of the computed slowness parameter is derived from the formation density, fluid density, a fluid slowness parameter and a shear wave slowness parameter.

3. A method as in claim 1 wherein said acoustic waveforms are measured at four or more longitudinally spaced locations in said borehole.

4. A method as in claim 1 further comprising the step of determining a selected frequency range containing the predominant energy of the tube wave in said waveforms, and wherein said step of filtering said waveforms comprises filtering out those signals which are outside the selected frequency range.

5. A method of determining the permeability of an earth formation traversed by a borehole, using a tool adapted for movement in said borehole, comprising:
  transmitting acoustic energy from a first location on said tool;
  measuring the acoustic waveforms of the transmitted energy at a plurality of locations on said tool at varying distances from said first location;
  filtering each of said waveforms to obtain a low frequency tube wave component;
  determining a measured slowness parameter of said tube wave component;
  determining a shear wave component for each of said acoustic waveforms;
  generating a value of the density of the formation;
  generating a value of the density of the borehole fluid;
  generating a value of the fluid slowness parameter;
  from the generated values of densities and fluid slowness parameter, deriving a computed slowness parameter of said tube wave component;
  determining the difference between the measured slowness parameter and the computed slowness parameter;
  determining the permeability of said formation from the difference between the generated values of the measured slowness parameter and said computed slowness parameter of the tube waves.

* * * * *